United States Patent
Bender et al.

(10) Patent No.: US 10,594,482 B2
(45) Date of Patent: Mar. 17, 2020

(54) SELF MANAGEMENT OF CREDENTIALS BY IOT DEVICES

(71) Applicant: International Business Machines Corporation, Armonk, NY (US)

(72) Inventors: Michael Bender, Rye Brook, NY (US); Rahul Gupta, Austin, TX (US); Timothy J. Hahn, Cary, NC (US); Leucir Marin Junior, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 15/450,466

(22) Filed: Mar. 6, 2017

(65) Prior Publication Data
US 2018/0255037 A1    Sep. 6, 2018

(51) Int. Cl.
| H04L 29/06 | (2006.01) |
| H04L 9/08 | (2006.01) |
| H04W 4/70 | (2018.01) |
| G06F 21/44 | (2013.01) |
| G06F 21/45 | (2013.01) |

(52) U.S. Cl.
CPC ............ *H04L 9/0891* (2013.01); *G06F 21/44* (2013.01); *G06F 21/45* (2013.01); *H04L 63/068* (2013.01); *H04L 63/083* (2013.01); *H04L 63/0823* (2013.01); *H04W 4/70* (2018.02); *G06F 2221/2129* (2013.01); *G06F 2221/2137* (2013.01); *H04L 2463/121* (2013.01)

(58) Field of Classification Search
CPC ....... H04L 63/06; H04L 9/0891; H04L 63/10; H04L 63/083

USPC .......................................................... 726/4–6
See application file for complete search history.

(56) References Cited

U.S. PATENT DOCUMENTS

| 5,872,914 A | 2/1999 | Walker, Jr. et al. |
| 6,826,700 B1 | 11/2004 | Germscheid et al. |
| 7,165,267 B1 * | 1/2007 | Utsumi .................. G06F 21/80 709/229 |

(Continued)

OTHER PUBLICATIONS

Burr et al., Electronic Authentication Guideline. US Department of Commerce, Technology Administration, National Institute of Standards and Technology, 2004, 122 pages.

(Continued)

*Primary Examiner* — Jahangir Kabir
(74) *Attorney, Agent, or Firm* — Reza Sarbakhsh; Edell, Shapiro & Finnan, LLC (57) ABSTRACT

A method, a device and a computer program product are provided. A networked device determines whether a condition occurred. In response to detecting the condition, the networked device requests information to update a current credential of the networked device. The networked device updates the current credential with the requested information to maintain security of the networked device. The networked device accesses at least one networked service based on the updated credential. The current credential includes either a cryptographic key or a password. When the current credential includes the password, the condition includes a usage rate including one or more from a group of a quantity of reboot commands for the networked device and a quantity of software update commands for the networked device.

20 Claims, 5 Drawing Sheets

(56) References Cited

U.S. PATENT DOCUMENTS

| | | | |
|---|---|---|---|
| 7,480,932 B2 | 1/2009 | Nakao | |
| 7,657,532 B2 | 2/2010 | Murakami | |
| 7,814,558 B2 | 10/2010 | Chen et al. | |
| 8,078,881 B1 * | 12/2011 | Liu | G06F 21/31 |
| | | | 713/183 |
| 8,526,604 B2 * | 9/2013 | Batra | H04W 52/0225 |
| | | | 380/31 |
| 8,607,303 B2 | 12/2013 | Morris et al. | |
| 9,258,715 B2 * | 2/2016 | Borghei | H04W 12/08 |
| 10,003,467 B1 * | 6/2018 | Miller | H04L 9/3268 |
| 2010/0174758 A1 | 7/2010 | Radenkovic et al. | |
| 2015/0319185 A1 * | 11/2015 | Kirti | H04L 63/1416 |
| | | | 726/23 |

OTHER PUBLICATIONS

Hojabri et al., "Innovation in cloud computing: Implementation of Kerberos version5in cloud computing in order to enhance the security issues." Information Communication and Embedded Systems (ICICES), 2013 International Conference on. IEEE, 2013, 5 pages.

* cited by examiner

SELF MANAGEMENT OF CREDENTIALS BY IOT DEVICES

BACKGROUND

Present invention embodiments are related to systems, methods and computer program products for an Internet of Things (IoT) device to automatically renew its credentials. In particular, present invention embodiments relate to systems, methods and computer program products for an IoT device to renew its credentials at predetermined time intervals or after one or more conditions are detected.

The IoT is the internetworking of a variety of physical devices, buildings, and other items that are embedded with one or more of electronics, sensors, actuators, and software, and have network connectivity that enable these items to collect and exchange data. IoT devices can access different services on a network such as, for example, an Internet or other networks. Many IoT devices use a default password that may or may not be changeable after a first use. Owners of IoT devices, typically, don't often change passwords used by their IoT devices, if at all. Further, many IoT devices do not provide a way to easily maintain passwords or other credentials. Thus, if a password or other credential of an IoT device is compromised, an unauthorized person or entity may have access to confidential information for an extended period of time.

SUMMARY

In a first aspect of the invention, a method is provided for managing credentials of a networked device for access to network services. A networked device may determine an occurrence of a condition. In response to detecting the condition, the networked device may request information to update a current credential. The networked device may update the current credential with the requested information to maintain security of the networked device. The networked device may then access at least one networked service based on the updated current credential. The current credential includes either a cryptographic key or a password. When the current credential includes the password, the condition includes a usage rate including one or more from a group of a quantity of reboot commands for the networked device and a quantity of software update commands for the networked device.

In a second aspect of the invention a device is provided. The device includes at least one processor, at least one memory, a communication interface for communicating with one or more other devices via a network, and a bus for connecting the at least one processor with the at least one memory and the communication interface, wherein the at least one processor is configured to: determine an occurrence of a condition; request information to update a current credential of the device in response to detection of the condition; update the current credential of the device with the requested information to maintain security of the device; and accessing, by the device, at least one networked service based on the updated credential. The current credential includes either a cryptographic key or a password, and when the current credential includes a password, the condition includes a usage rate including one or more from a group of a quantity of reboot commands for the device and a quantity of software update commands for the device.

In a third aspect of the invention, at least one computer program product is provided. The computer program product includes at least one computer readable storage medium having computer readable program code embodied therewith for execution on at least one processor. The computer readable program code is configured to be executed by the at least one processor to perform: determining an occurrence of a condition; requesting information to update a cryptographic key in response to detection of the condition; updating the cryptographic key with the requested information to maintain security; and accessing at least one networked service based on using the updated cryptographic key.

BRIEF DESCRIPTION OF THE DRAWINGS

Generally, like reference numerals in the various figures are utilized to designate like components.

DETAILED DESCRIPTION

Present invention embodiments include methods, devices and computer program products for networked IoT devices to periodically change their respective credentials. The credentials may include, but not be limited to, a password, a symmetric cryptographic key and a public/private key and associated certificate. Each networked IoT device may have one or more credentials that are unique per network service to be used by the IoT device and may refresh the one or more credentials based on a schedule.

In various embodiments, a networked IoT device may dynamically request and negotiate with an identity provider one or more new credentials, which may include, but not be limited to, at least one item selected from a password, a symmetric cryptographic key, and a pair of public/private keys. In some embodiments, each IoT device may refresh its one or more credentials based on a defined schedule or frequency such as, for example, beginning February $1^{st}$ at 8:00 AM with a frequency of twice daily, or another initial time and frequency. In some embodiments, a networked IoT device may dynamically request and negotiate, with an identity provider, one or more new credentials under any one of a number of conditions, which may include, but not be limited to, at least one item selected from an occurrence of a scheduled time period and frequency, a determined usage rate (for example, after the networked IoT device receives a given number of reboot commands or a given number of firmware or software update commands), after the IoT device detects a connection to a new network, after receiving a notification about possible hacking, and after a configured period of time prior to the declared expiration time/date of the credential.

In some embodiments, IoT devices may reduce thresholds for refreshing their respective credentials and lowering credential complexity if no vulnerabilities are detected over a predetermined number of regular iterations of credential refreshing. For example, if no vulnerabilities are detected after a predefined time period or after a given number of credential refreshes, a frequency at which credential refreshing occurs may be decreased and/or the refreshed credentials may become less complex. For example, if passwords normally are at least 20 characters long and include at least one item selected from each of a group of upper case letters, a group of lower case letters, punctuations, symbols and numbers, and no vulnerabilities are detected over a predefined time period or after a given number of credential refreshes, then passwords may be allowed to be at least 8 characters long and may include any of upper case letters, lower case letters and numbers. Similarly, less complex cryptographic keys may be generated if no vulnerabilities are detected over a predefined time period or during a period of time that includes a given number of credential refreshes.

In the various embodiments, when a networked IoT device refreshes its one or more credentials, the networked IoT device may send notifications to one or more device owners and systems that depend on any of the one or more credentials.

Figure 1:
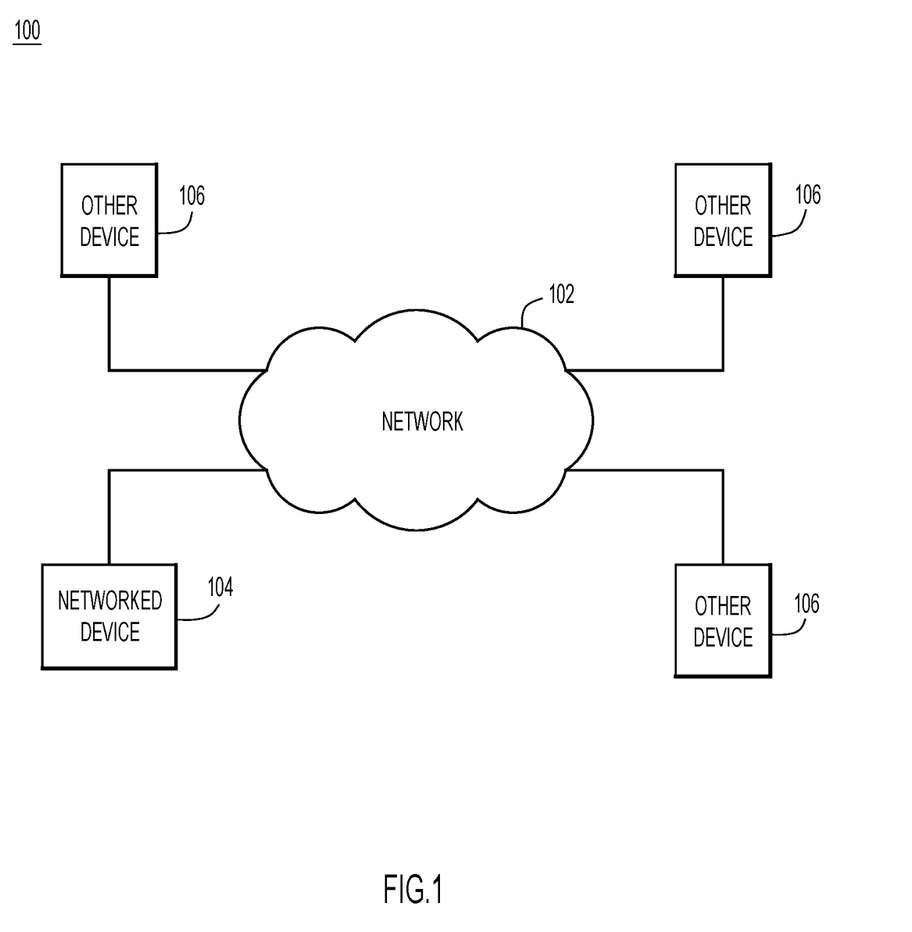
FIG. 1 illustrates an example environment for implementing various embodiments.

FIG. 1 shows an example environment 100 in which various embodiments may be implemented. The example environment may include a network 102, a networked device 104, and a number of other devices 106. Network 102 may include a local area network (LAN), a wide area network (WAN), a public switched data network (PSDN), a wireless network, a wired network, the Internet, an intranet, other types of networks, or any combination of the above. Networked device 104 may include an IoT device. Other devices 106 may be any of a variety of devices including, but not limited to, other IoT devices, servers, routers, client devices and host devices.

Figure 2:
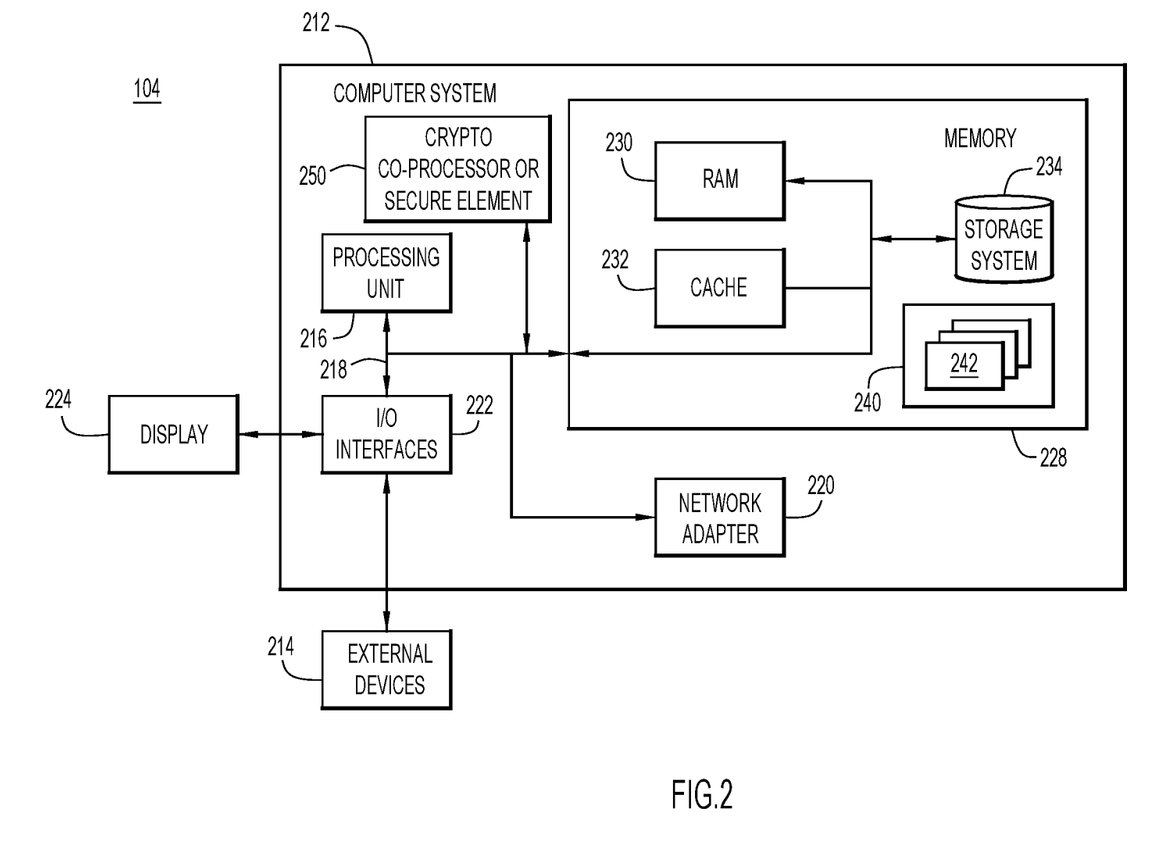
FIG. 2 is a functional block diagram of an example computing system which may be embedded in an IoT device.

FIG. 2 illustrates at least a portion of networked device 104 in which embodiments of the invention may be implemented. Networked device 104 may include computer system 212. Components of computer system 212 may include, but are not limited to, one or more processors or processing units 216, a cryptographic co-processor or secure element 250, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Storage system 234 may include other types of storage for reading and writing including, but not limited to, flash memory and Secure Digital (SD) card. Storage system 234 can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate, either wired or wirelessly, with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, and redundant processing units, etc.

Figure 3:
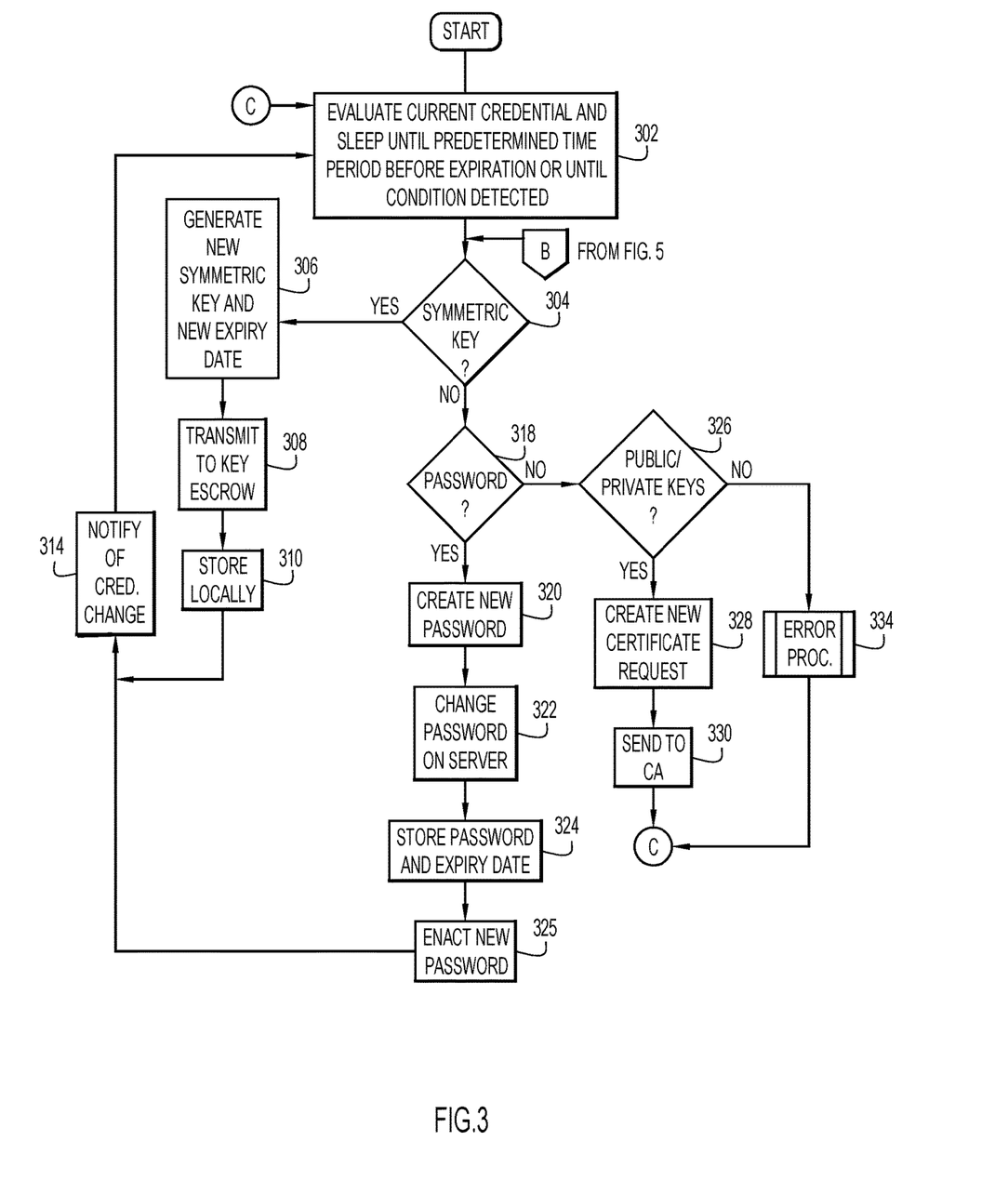
FIG. 3 is a flowchart of an example process that may be performed by an IoT device to automatically change a credential according to an embodiment.

FIG. 3 is a flowchart of an example process that may be performed by an agent executing in IoT device 104 for refreshing a credential. The process may begin with the agent executing on IoT device 104 evaluating a current credential used by IoT device 104 and sleeping until a predetermined time period before expiration of the current credential or until a condition is detected (act 302). At the predetermined time period before expiration of the current credential or after the condition is detected, a determination may be made regarding whether the current credential is a symmetric cryptographic key (act 304). If, during act 304, the current credential is determined to be the symmetric cryptographic key then either IoT device 104 or another device connected to IoT device 104 via network 102 may be called upon to generate a new symmetric key and a new expiration date or time (act 306). The new symmetric key may then be transmitted to a key escrow device, which may store the new symmetric key and the expiration date or time (act 308). The new symmetric key may also be stored locally by IoT device 104 in memory 228 (act 310). The new symmetric key may be generated and stored within cryptographic co-processor or secure element 250 (FIG. 2), which is included in IoT device 104.

Next, IoT device 104 may send a notification to an owner of IoT device 104, a user of IoT device 104 and dependent systems regarding the changed credential (act 314). IoT device 104 may then go to sleep until a predetermined time period before the current credential expires or until a condition is detected (act 302).

If, during act 304, the current credential is determined not to be the symmetric key, then a determination may be made regarding whether the current credential is a password (act 318). If, during act 318, the current credential is determined to be the password, then either IoT device 104 may generate a new password or IoT device 104 may call upon another device to generate a new password and provide the new password to IoT device 104 (act 320). Next, IoT device 104 may change the password to the new password on a server that provides a service used by IoT device 104 (act 322). IoT device 104 may then store the new password and a corresponding expiration date or time in memory 228 (act 324) and may enact the new password (act 325). Acts 314 and 302 may again be performed.

In some embodiments, IoT device 104 may also use a cryptographic co-processor or secure element 250 having stored therein a symmetric encryption key to encrypt the new password stored in memory 228 such that the password value can only be un-encrypted from within IoT device 104 and only by using the cryptographic co-processor or secure element 250 which holds the stored symmetric encryption key used to encrypt the password value stored in memory 228.

If, during act 318, the current credential is determined not to be the password, then a determination may be made regarding whether the current credential is a pair of public/private cryptographic keys associated with a certificate (act 326). If the current credential is determined to be the pair of public/private cryptographic keys, then IoT device 104 may create a new certificate request (act 328) and may send the new certificate request to a certificate authority (act 330). During creation of the new certificate request (act 328) the existing public/private key pair may be re-used or a new public/private key pair may be generated. Acts 314 and 302 may again be performed.

If, during act 326, the current credential is determined not to be the pair of public/private cryptographic keys, then an error process may be performed (act 334) and act 302 may again be performed.

Figure 4:
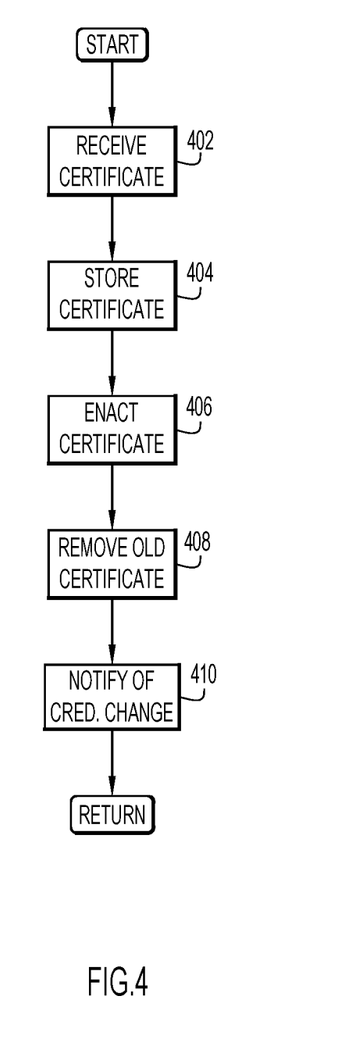
FIG. 4 is a flowchart of an example process that may be performed in an IoT device after a certificate for a pair of public/private cryptographic keys is requested according to an embodiment.

FIG. 4 is a flowchart of an example process that may be performed by the agent in IoT device 104 when a certificate is received in response to sending a certificate request. The process may begin with receiving the certificate (act 402). IoT device 104 may then store the certificate locally (act 404) and may further enact the certificate (act 406). The old certificate may then be removed from local storage by IoT device 104 (act 408) and a credential change notification may be sent by IoT device 104 to an owner of IoT device 104, a user of IoT device 104 and any system that depends on the current credential of IoT device 104 (act 410).

Figure 5:
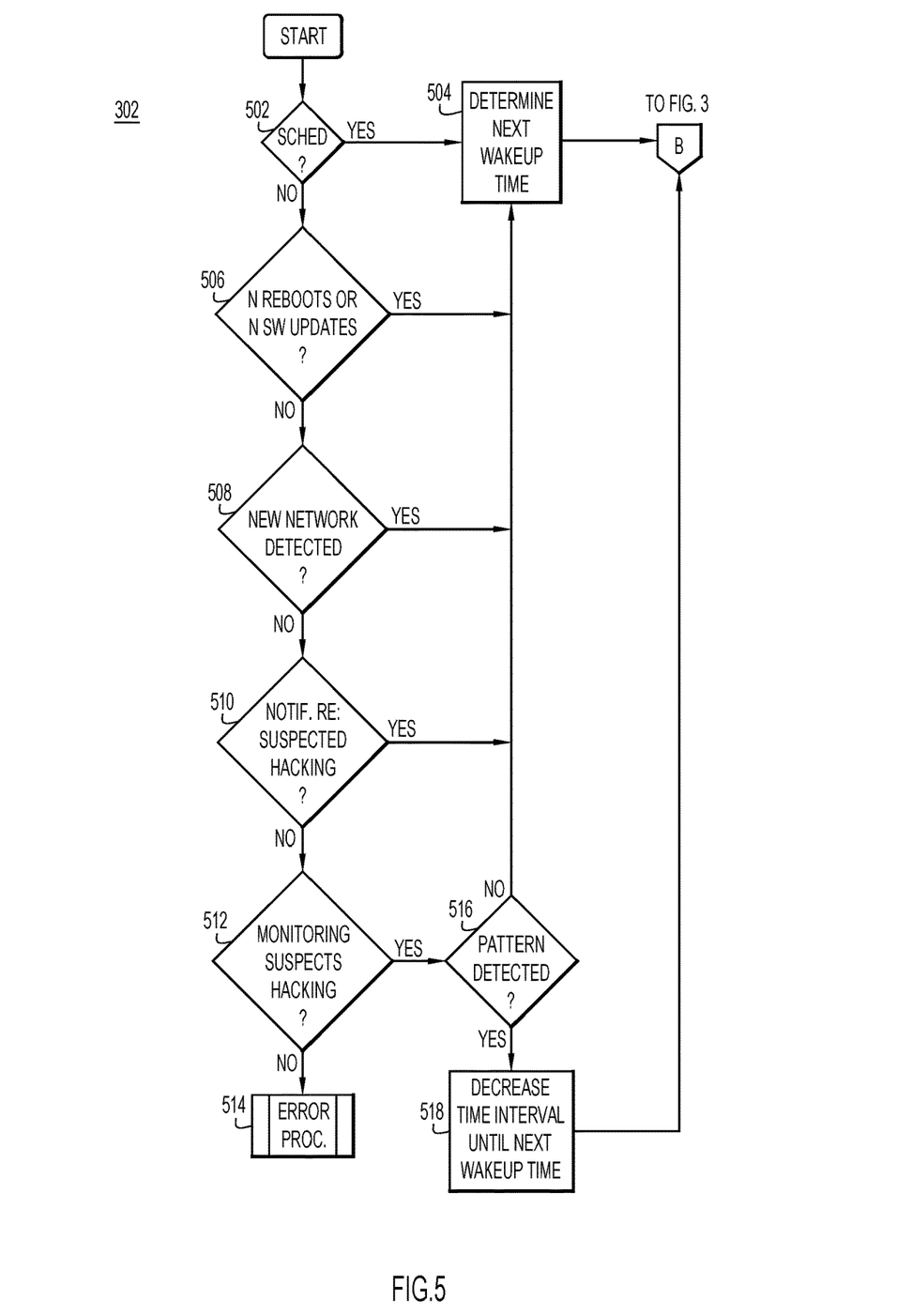
FIG. 5 is a flowchart of an example process for performing act 302 of FIG. 3 to sleep until a predetermined time period before expiration of a current credential or upon detecting an occurrence of a condition and evaluating a current credential or the condition according to an embodiment.

FIG. 5 is a flowchart that illustrates example processing with respect to act 302 of FIG. 3. The process may begin by determining whether the process woke up due to a scheduled wake up time before the current credential expires (act 502). If the process woke up due to the scheduled wake up time, then a next wake-up time may be determined (act 504) followed by performing act 304 of FIG. 3.

If, during act 502 it is determined that the process did not wake up due to a scheduled wake up time, then the process may determine whether it woke up due to one of a number of conditions. For example, a determination may be made regarding whether the process woke up due to a predetermined number of reboots or software or firmware updates having been performed (act 506). If it is determined that the process woke up due to the predetermined number reboots or software or firmware updates, then act 504 may be performed to determine a next wake up time followed by act 304 of FIG. 3.

If, during act 506 it is determined that the process did not wake up due to the predetermined number of reboots or the predetermined number of software or firmware updates, then act 508 may be performed to determine whether the process woke up due to IoT device 104 being connected to a new network (act 508). If it is determined that the process woke up due to IoT device 104 being connected to the new network, then IoT device 104 may determine a next wake-up time (act 504) followed by performing of act 304 of FIG. 3.

If, during act 508 it is determined that the process did not wake up due to IoT device 104 being connected to a new network, then act 510 may be performed to determine whether the process woke up due to IoT device 104 receiving a notification regarding suspected hacking. If it is determined that the process woke up due to IoT device 104 receiving the notification regarding suspected hacking, then IoT device 104 may determine a next wake-up time (act 504) followed by performing of act 304 of FIG. 3.

If, during act 510 it is determined that the process did not wake up due to receiving the notification regarding suspected hacking, then act 512 may be performed to determine whether the process woke up due to IoT device 104 receiving an indication from a monitoring process indicating that hacking is suspected. If it is determined that the process woke up due to IoT device 104 receiving the indication from the monitoring process indicating that hacking is suspected, then IoT device 104 may determine whether a pattern of hacking is detected (act 516). If the pattern of hacking is not detected then IoT device 104 may determine a next wake-up time (act 504) followed by performing of act 304 of FIG. 3. Otherwise, IoT device 104 may decrease a time interval until the next wakeup time (act 518) followed by act 504 and act 304 of FIG. 3.

If, during act 512, it is determined that the process did not wakeup due to receiving the indication from the monitoring process indicating that hacking is suspected, then error processing may be performed (act 514).

In some embodiments instead of performing act 518 to decrease the time interval until the next wakeup time when a pattern of suspected hacking is detected, IoT device 104 may indicate that an increase of complexity of a new credential is requested such that the new credential will include a more complex cryptographic key or pair of cryptographic keys, or a more complex password. In other embodiments, when the pattern of suspected hacking is detected, then in addition to performing act 518, IoT device 104 may indicate that an increasing complexity of a new credential is requested, such as a more complex cryptographic key or pair of cryptographic keys, or a more complex password.

In some embodiments, when vulnerabilities are not detected by IoT device 104 for at least a predefined period of time, then a time interval until a next wakeup time may be increased and/or a new credential may be less complex.

Although the flowchart of FIG. 5 illustrates determining whether one of a number of several specific conditions occurred, other embodiments may determine whether other conditions or whether any of the above-mentioned conditions as well as additional conditions occurred.

The environment of the present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A method of managing credentials of a networked device for access to at least one network service, the method comprising:
   determining, by the networked device, an occurrence of any one of a plurality of conditions the plurality of conditions including a given number of system reboot commands for the networked device, the networked device being provided with the access to the at least one network service via a server separate from the networked device;
   requesting, by the networked device, information to update a current credential of the networked device for use in accessing the at least one network service in response to the determining of the occurrence of the any one of the plurality of conditions;

updating, by the networked device, the current credential of the networked device with the requested information to maintain security of the networked device; and accessing, by the networked device, a network service of the at least one network service based on the updated current credential.

2. The method of claim 1, wherein:
the current credential includes a password, and
the requesting of the information comprises:
requesting a new password from an identity provider.

3. The method of claim 1, wherein:
the current credential includes a cryptographic key, and
the plurality of conditions includes a scheduled time and a frequency for updating the current credential.

4. The method of claim 1, wherein:
the current credential includes a cryptographic key, and
the plurality of conditions includes one or more from a group of a given number of firmware update commands for the networked device and the given number of software update commands for the networked device.

5. The method of claim 1, wherein:
the current credential includes a cryptographic key, and
the plurality of conditions further includes one or more from a group of detection of an unauthorized access of the networked device and connection of the networked device to a new network.

6. The method of claim 1, further comprising:
sending, by the networked device, notifications to one or more entities pertaining to the updating of the current credential.

7. The method of claim 1, wherein the networked device includes a device in an Internet of Things environment.

8. The method of claim 1, wherein:
the current credential includes a cryptographic key,
one of the plurality of conditions includes receiving a notification concerning possible compromised security of the networked device, and
the method further comprises automatically increasing a frequency of performing the determining of an occurrence of any one of a plurality of conditions when the occurrence of the any one of the plurality of conditions is determined.

9. A device comprising: at least one processor;
at least one memory;
a communication interface for communicating with one or more other devices via a network; and
a bus for connecting the at least one processor with the at least one memory and the communication interface, wherein the at least one processor is configured to:
determine an occurrence of any one of a plurality of conditions, the plurality of conditions including a given number of system reboot commands for the device, the device being provided with access to at least one network service via a server separate from the device;
request information to update a current credential of the device for use in accessing the at least one network service in response to detection of the any one of the plurality of conditions;
update the current credential of the device with the requested information to maintain security of the device; and
access, by the device, at least one network service based on the updated credential.

10. The device of claim 9, wherein:
the current credential includes a password, and
the requesting of the information comprises:
requesting a new password from an identity provider.

11. The device of claim 9, wherein:
the current credential includes a cryptographic key, and
the plurality of conditions include a scheduled time and a frequency for updating the current credential.

12. The device of claim 9, wherein:
the current credential includes a cryptographic key, and
the plurality of conditions includes one or more from a group of a given number of firmware update commands for the device and the given number of software update commands for the device.

13. The device of claim 9, wherein:
the current credential includes a cryptographic key, and
the plurality of conditions includes one or more from a group of detection of an unauthorized access of the device and connection of the device to a new network.

14. The device of claim 9, wherein the at least one processor is further configured to:
send notifications to one or more entities pertaining to updating of the current credential.

15. The device of claim 9, wherein:
the current credential includes a cryptographic key,
one of the plurality of conditions includes receiving a notification concerning possible compromised security of the networked device, and
the at least one processor is further configured to automatically increase a frequency of performing the determining of an occurrence of any one of a plurality of conditions when the any one of the plurality of conditions is detected.

16. A computer program product comprising:
at least one non-transitory computer readable storage medium having computer readable program code embodied therewith for execution on at least one processor of a device, the computer readable program code being configured to be executed by the at least one processor to perform:
determining an occurrence of any one of a plurality of conditions, the plurality of conditions including a given number of system reboot commands for the device, the device being provided with access to at east one network service via a server separate from the device:
requesting information to update a cryptographic key for use by the device to access the at least one network service in response to the determining of the occurrence of the any one of the plurality of conditions:
updating the cryptographic key with the requested information to maintain security; and
accessing a network service of the at least one network service based on using the updated cryptographic key, wherein:
in response to the determining the occurrence of the any one of the plurality of conditions, the computer readable program code is further configured to be executed by the at least one processor to automatically increase a frequency of the determining an occurrence of any one of the plurality of conditions.

17. The computer program product of claim 16, wherein:
the plurality of conditions includes a scheduled time and a frequency for updating the current credential.

18. The computer program product of claim 16, wherein:
the plurality of conditions includes one or more from a group of a given number of firmware update commands for the device and the given number of software update commands from the device.

19. The computer program product of claim 16, wherein:
the plurality of conditions includes one or more from a group of detection of an unauthorized access of the device and connection of the device to a new network.

20. The computer program product of claim 16, wherein:
the plurality of conditions include receiving a notification concerning possible compromised security of the device, and
the computer-readable program code is further configured to executed by the at least one processor to perform:
lowering a cryptographic key regeneration threshold when the receiving of the notification concerning possible compromised security of the device is determined.

\* \* \* \* \*